United States Patent
Chang

(10) Patent No.: US 10,523,124 B1
(45) Date of Patent: Dec. 31, 2019

(54) TWO-STAGE MULTI-PHASE SWITCHING POWER SUPPLY WITH RAMP GENERATOR DC OFFSET FOR ENHANCED TRANSIENT RESPONSE

(71) Applicant: DIALOG SEMICONDUCTOR (UK) LIMITED, London (GB)

(72) Inventor: Kevin Yi Cheng Chang, Chandler, AZ (US)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 0 days.

(21) Appl. No.: 16/014,986

(22) Filed: Jun. 21, 2018

(51) Int. Cl.
*H02M 3/158* (2006.01)
*H02M 1/088* (2006.01)
*H02M 1/00* (2006.01)

(52) U.S. Cl.
CPC ......... *H02M 3/1584* (2013.01); *H02M 1/088* (2013.01); *H02M 2001/0009* (2013.01); *H02M 2001/0048* (2013.01)

(58) Field of Classification Search
CPC ....... H02M 3/1584; H02M 2001/0009; H02M 2001/0048; H02M 1/088
See application file for complete search history.

(56) References Cited

U.S. PATENT DOCUMENTS

| | | | | |
|---|---|---|---|---|
| 7,492,134 B2* | 2/2009 | Tang | ................... | H02M 3/1584 323/241 |
| 8,134,353 B2* | 3/2012 | Chen | ................... | H02M 3/1584 323/241 |
| 9,755,517 B2* | 9/2017 | Kobayashi | ............ | H02M 3/158 |
| 2010/0194361 A1* | 8/2010 | Hardman | ............ | H02M 3/1584 323/282 |
| 2017/0060154 A1* | 3/2017 | Ozawa | ................... | G05F 1/575 |

OTHER PUBLICATIONS

A. Costabeber, P. Mattavelli, and S. Saggini, "Digital Time-Optimal Phase Shedding in Multiphase Buck Converters," IEEE Transactions on Power Electronics, vol. 25, No. 9, Sep. 2010, pp. 2242-2247.
L. T. Jakobsen, O. Garcia, J. A. Oliver, P. Alou, J. A. Cobos and M. A. E. Andersen, "Interleaved Buck Converter with Variable Number of Active Phases and a Predictive Current Sharing Scheme," IEEE Power Electronics Specialists Conference, 2008. PESC 2008.
Jia Wei and Fred C. Lee, "Two-Stage Voltage Regulator for Laptop Computer CPUs and the Corresponding Advanced Control Schemes to Improve Light-Load Performance," IEEE Applied Power Electronics Conference and Exposition, 2004. APEC '04.
J. A. A. Qahouq, and L. Huang, "Highly efficient vrm for wide load range with dynamic non-uniform current sharing," IEEE Applied Power Electronics Conf., 2007, pp. 543-547.

* cited by examiner

*Primary Examiner* — Jue Zhang
(74) *Attorney, Agent, or Firm* — Haynes and Boone, LLP

(57) ABSTRACT

A multi-phase switching power converter is disclosed in which the duty cycle of active phases following a phase shedding transition is temporarily adjusted to increase the operating speed of the multi-phase switching power converter.

14 Claims, 7 Drawing Sheets

TWO-STAGE MULTI-PHASE SWITCHING POWER SUPPLY WITH RAMP GENERATOR DC OFFSET FOR ENHANCED TRANSIENT RESPONSE

TECHNICAL FIELD

This application relates to switching power converters, and more particularly to a two-stage multi-phase switching power converter with temporary duty cycle DC offset to enhance transient response.

BACKGROUND

A typical computing power supply for laptops and related devices such as tablets uses a combination of Lithium Ion (Li-Ion) batteries, usually arranged in groups of two cells in series that produces a maximum voltage of approximately 10V. Such a relatively high power supply voltage is unsuitable for modern integrated circuits so these devices conventionally include a buck converter to regulate the battery power supply voltage from the series-connected batteries to an internal power supply voltage such as 1V for powering the integrated circuits within the devices.

A single stage multi-phase buck converter would require high voltage components to step down from such a relatively high battery power supply voltage to the relatively low internal power supply voltage. The use of such high voltage components demands substantial die space to achieve suitable drain-to-source resistances and also leads to higher gate drive losses and voltage-current overlap switching losses for the power switches. Thus, single stage multi-phase buck converters are not very efficient in applications in which the output voltage is substantially stepped down from, for example, around 10V to 1V.

To improve the efficiency and increase density, two-stage multi-phase DC/DC power converters have been developed in which a first stage multi-phase buck converter drives a second stage multi-phase buck converter with an intermediate voltage. The second stage multi-phase buck converter regulates the output voltage using the intermediate voltage as an input power supply. The second stage may use high-speed core transistors since the intermediate voltage is reduced as compared to the relatively-high battery voltage. Although such two stage voltage regulators have desirable efficiency and density in theory, their conventional implementation suffers from a number of problems. For example, phase shedding results in transient changes in the currents across the active phases that cause the output voltage to deviate from its steady-state value. But fast response of a phase-shedding scheme requires these transitions in the inductor currents to settle quickly. As a result, the response speed of conventional multi-phase buck converters is limited.

Accordingly, there is a need in the art for multi-phase buck converters with improved response speeds.

SUMMARY

A phase-shedding scheme for a multi-phase buck converter is disclosed that responds to changes in output current by changing the number of active phases accordingly. After a phase shedding transition in the number of active phases, the current through each active phase will be temporarily displaced from its steady-state value after the phase shedding transition. To make this transition period shorter and thus enhance response speed, a duty cycle compensation circuit adjusts the pulse width modulation for each active phase during the transition period. In particular, the duty cycle compensation circuit adjusts a DC voltage offset for the common-mode voltage (which may also be denoted as the center voltage) of a dual ramp signal that is compared to an error signal within each active phase. This offset in the center voltage for the dual-ramp signal produces a corresponding offset in the duty cycle for the affected phase. Should the total current change that triggered the phase transition be relatively small (below a threshold value), the DC voltage offset may be changed in complementary fashion for a pre-existing phase and for a newly-added phase. As used herein, a "pre-existing phase" refers to a phase that was already active prior to the phase shedding transition. Conversely, a "newly-added phase" refers to a phase that was not active prior to the phase shedding transition but that is being activated in the phase shedding transition. Alternatively, if the total current change is greater than the threshold value, the DC voltage offset may be applied with the same polarity in each active phase during the transition period. Regardless of the polarity of the applied DC voltage offset, the DC voltage offset is released in response to the active phase currents reaching their steady-state values so as to end the transition period.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To speed the response speed, a phase shedding control scheme for a multi-phase switching power converter is disclosed in which the duty cycle of the PWM modulation in the active phases is temporarily compensated to account for the average load current change that triggered a change in the number of the active phases. For example, suppose that a multiphase switching power converter is operating only with a first active phase driving a load with an output current at a first level. Should the load demand more current such that a second phase is activated, the two active phases will then drive the output current at a second level that is greater than the first level. Although the output current has increased, the current through the first phase reduces since it previously has been the only active phase. So the current in the first phase must drop to a new steady state value over a transition period whereas the current in the second phase increases from zero to its steady state value in the same transition period.

The duty cycle adjustment for the two phases is thus applied over the transition period and stopped after the steady state condition is achieved. The resulting duty cycle adjustment for the active phase pulse width modulation is quite advantageous with regard to speeding up the transition period over which the active phase currents reach their steady state values. The phase shedding in the second stage of a two-stage multi-phase switching power converter may be used to control the phase shedding in the first stage in the context of the disclosed duty cycle adjustment for a cross-domain phase shedding embodiment. The following examples will thus be directed to two-stage multi-phase switching power converter with cross-domain phase shedding control but it will be appreciated that the duty cycle adjustment disclosed herein may be advantageously employed in single stage multiphase switching power converters or in two-stage multiphase switching power converters in which the phase shedding for the two stages is independently controlled.

Figure 1A:
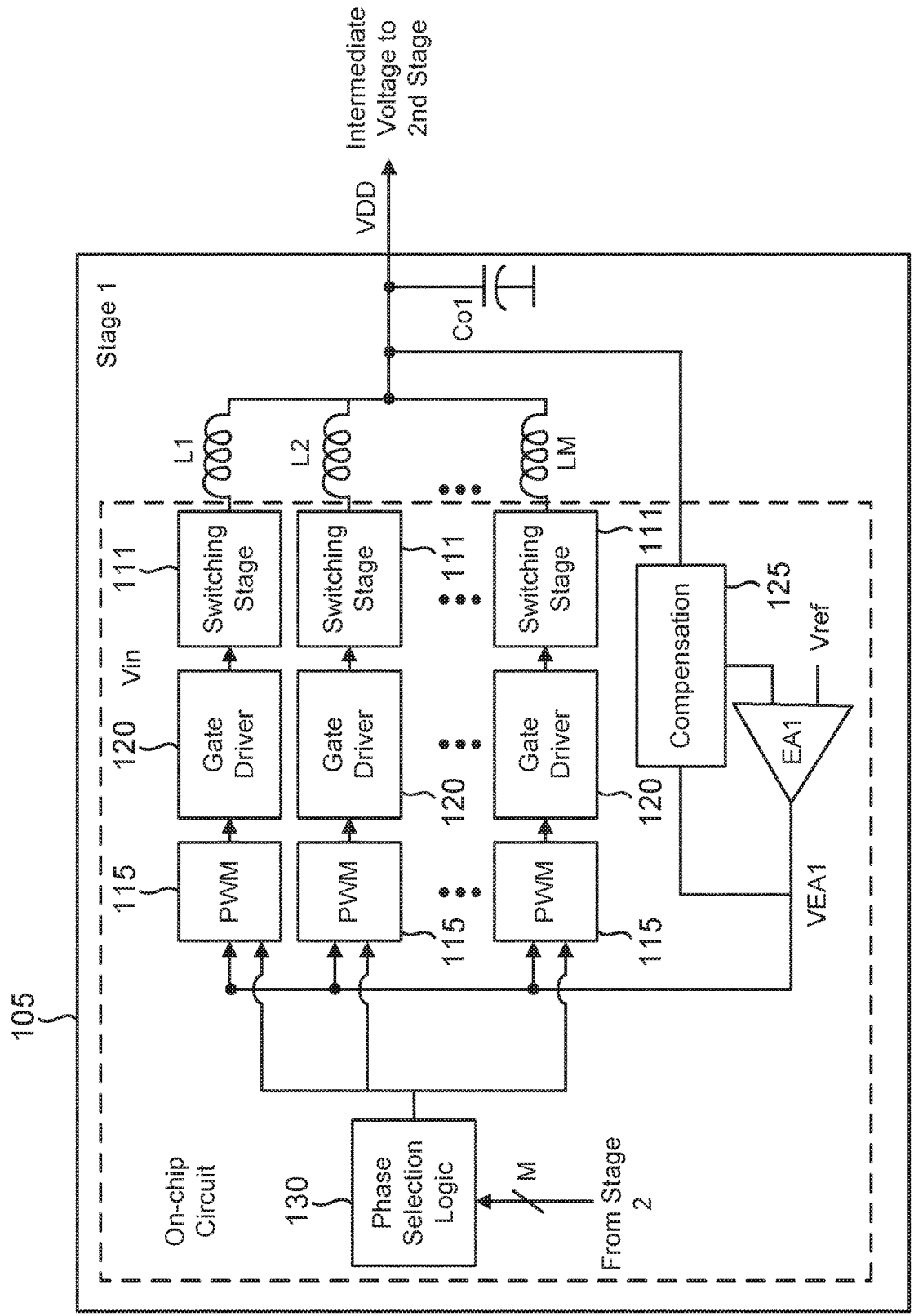
FIG. 1A is a diagram of a first stage switching power converter of a two stage switching power converter with cross domain phase shedding control in accordance with an aspect of the disclosure.
Figure 1B:
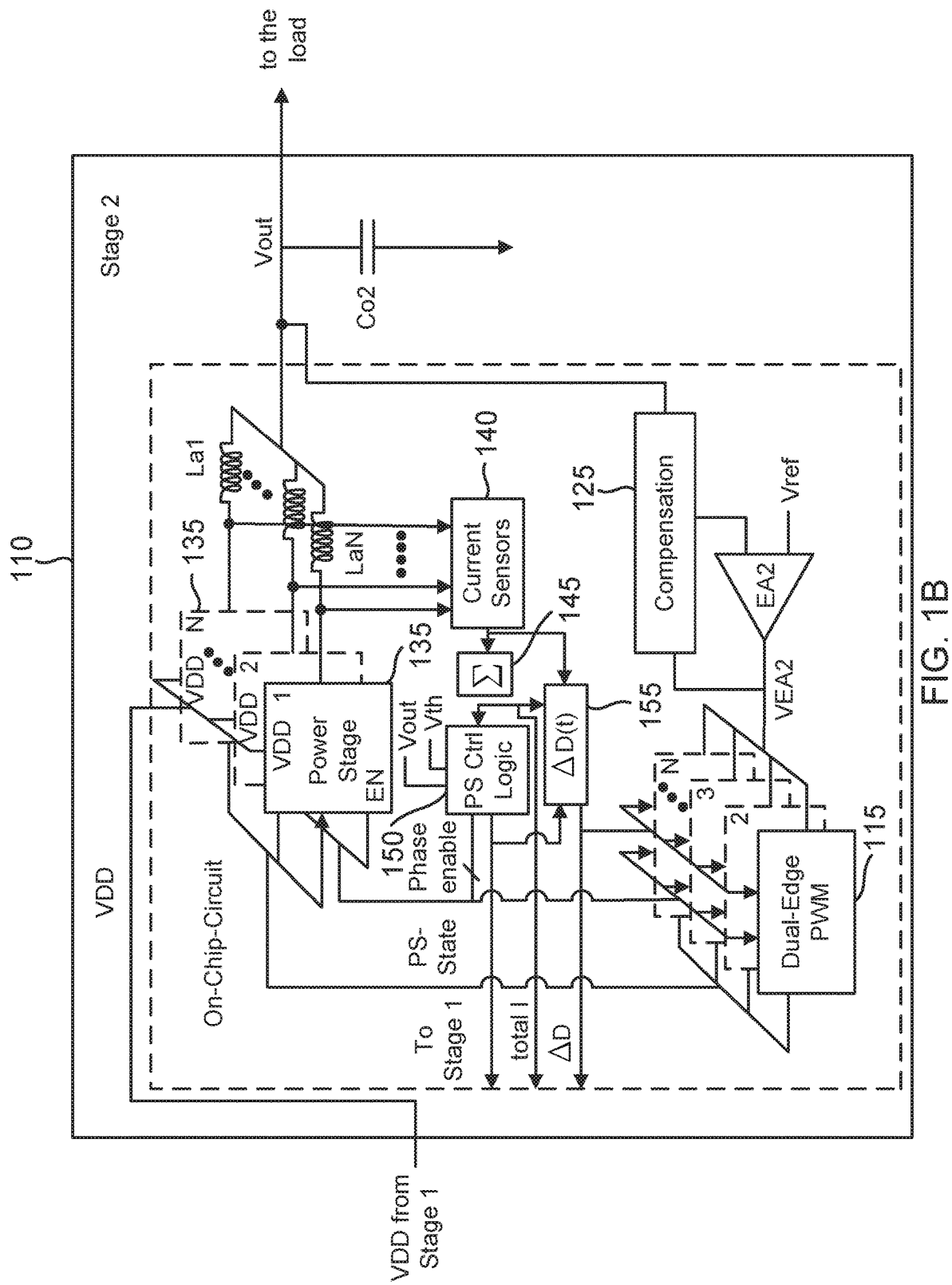
FIG. 1B is a diagram of a second stage switching power converter in a two stage switching power converter with cross domain phase shedding control in accordance with an aspect of the disclosure.

An example two-stage switching power converter with cross domain adaptive voltage control is shown in FIG. 1A and FIG. 1B. In particular, a first-stage multi-phase buck converter 105 is shown in FIG. 1A whereas a second-stage multi-phase buck converter 110 is shown in FIG. 1B. Referring now to FIG. 1A, first stage 105 includes a plurality of M phases corresponding to M inductors ranging from a first inductor L1 to an Mth inductor LM. Each phase includes a switching stage 111 having its own high-side switch and a low-side switch (the switches are not shown for illustration clarity). When a phase's high-side switch Si closes, an input voltage Vin causes a magnetizing current to flow through the phase's inductor as is known in the buck converter arts. As is also known in the buck converter arts, each phase has its own pulse-width modulator (PWM) 115 and gate driver 120. The active phases all drive an intermediate voltage VDD filtered by a first-stage output capacitor Co1. The voltage VDD functions as the input voltage to the switching stages in second-stage multi-phase buck converter 110 as will be explained further herein.

A first stage error amplifier EA1 that is compensated by a compensation network 125 compares a reference voltage Vref to the first stage output voltage VDD to generate a first stage error voltage VEA1 that is used by the pulse-width modulators 115 in the active phases for first stage 105 to control the pulse widths for the switching in these active phases. As compared to second stage 110, first stage 105 operates at a lower switching frequency and larger step-down voltage ratio. It is second stage 110 that is thus more sensitive to PVT variations due to its faster switching frequency and larger load current. A phase selection logic circuit 130 receives a phase selection command from second stage 110 and activates the appropriate number of first stage phases as will be explained further herein. In first stage 105, the various components other than the inductors and output capacitor may be integrated into an on-chip circuit.

Second stage multiphase buck converter 110 includes a plurality of N phases. The number N is independent of the number M for the phases in first stage 105. Thus, N may be larger than, smaller than, or equal to M. Each phase has the same basic components as discussed with regard to first stage 105 such that each phase in second stage 110 includes an inductor, ranging from a first inductor La1 for a first phase to an Nth inductor LaN for an Nth phase. The inductors are all tied to an output terminal for an output voltage (Vout) as supported by an output capacitor Co2. Each phase also includes a gate driver that controls the switching of a switching stage (for illustration clarity, each phase's switching stage and gate driver are represented by a power stage 135). However, power stages 135 in second-stage 110 drive a magnetizing current into their phase's inductor responsive to VDD whereas switching stages 111 in first-phase multi-phase buck converter 105 do so with regard to the input voltage Vin. A second stage error amplifier EA2 compares a second stage reference voltage Vref2 to the output voltage Vout to generate a second stage error voltage VEA2. As discussed with regard to first stage error amplifier EA1, second stage error amplifier EA2 includes a compensation network 125.

A current sensor 140 senses the inductor currents in the active second stage phases. For example, current sensor 140 may be configured to convert each sensed current into a voltage. The various voltages for the active phases are then summed as represented by a summing circuit 145 to obtain the total current for the active phases. In general, the inductor current for an active phase ramps up and down depending upon whether the high side switch or the low side switch in the corresponding power stage 135 is on or off. Current sensor 140 may thus sense the average current such that the total current from summing circuit 145 is the average total output current for the active phases. Alternatively, current sensor 140 may sense the peak inductor currents such that the total current from summing circuit 145 is the peak total output current for the active phases. The various components in second stage 110 may be integrated into an on-chip circuit as discussed with regard to first stage 105. In second stage 110, the inductors are formed using the metal layers over the semiconductor die such that the inductors are integrated with the remaining components (but for output capacitor Co2).

Figure 2:
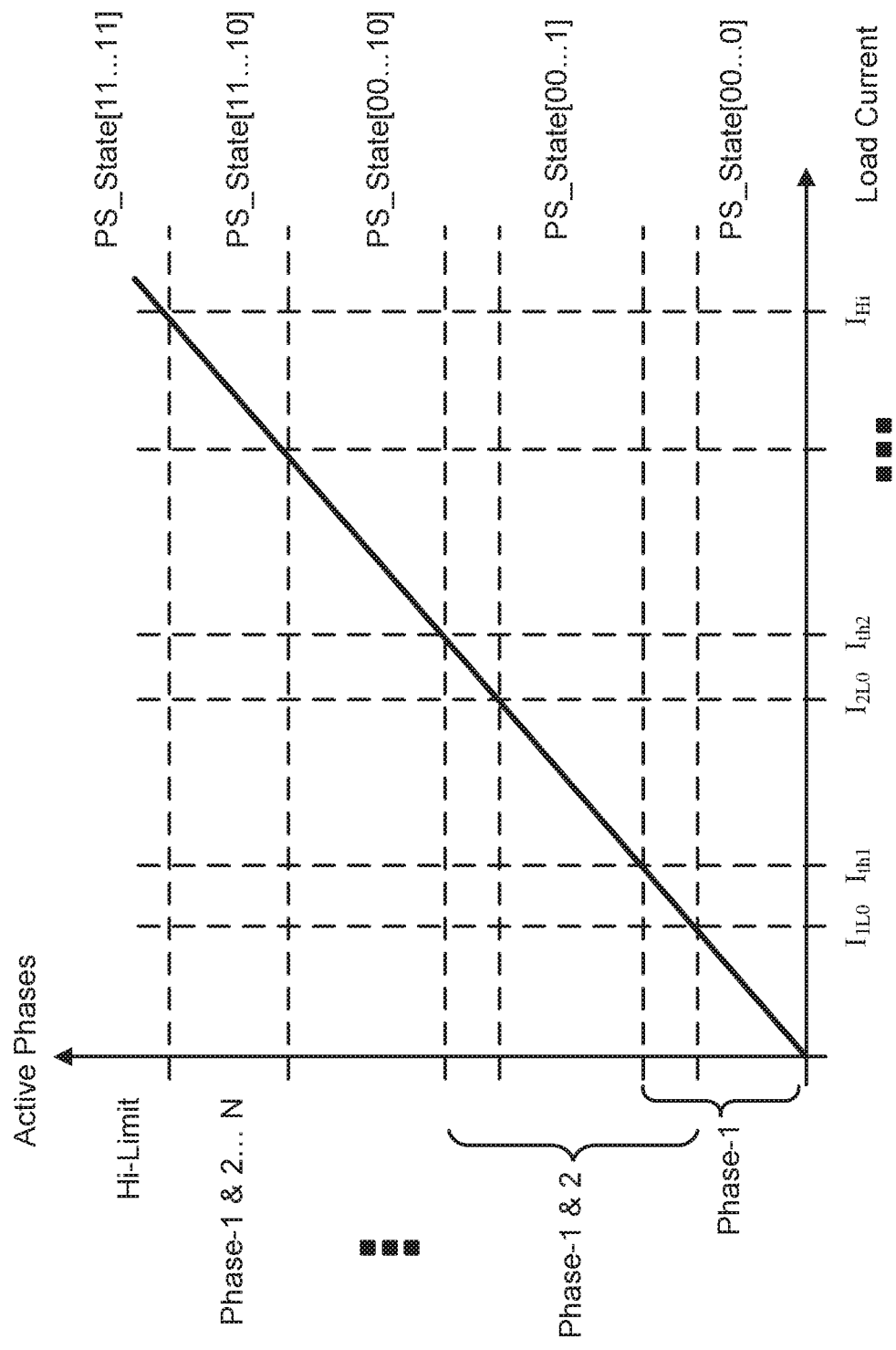
FIG. 2 is a plot of load current versus the phase activations for the phase shedding control circuit of FIG. 1B.

A phase shedding control circuit 150 controls the phase shedding or activation of the phases in second stage 110 responsive to the total current from summing circuit 145. For example, phase shedding control circuit 150 may be configured to compare the total current to various thresholds to control which phases are activated. Some example thresholds are shown in FIG. 2. Starting from a low load state, the total current is less than a first high threshold current $I_{th1}$ so that phase shedding control circuit 150 activates only a first phase 1. For example, phase shedding control circuit 150 may generate a phase shedding state variable PS_State equaling all zeroes PS_State[00 . . . 0] to activate the first phase. In response to the current rising above the $I_{th1}$ threshold but remaining below a second high threshold current $I_2$, phase shedding control circuit 150 changes the phase shedding state variable so that its LSB is binary high (PS_State[00 . . . 1]) to activate a second phase 2 as well. In this fashion, phase shedding control logic circuit 150 may continue to activate additional phases as the current rises above the corresponding thresholds. To reduce the effects of noise, phase shedding control circuit 150 uses hysteresis such that low current thresholds govern the de-activation of phases. For example, if the current drops below a low current threshold $I_{2Lo}$, phase shedding control circuit 150 changes the phase shedding state variable to again equal all zeroes so that only phase 1 is active.

Figure 3:
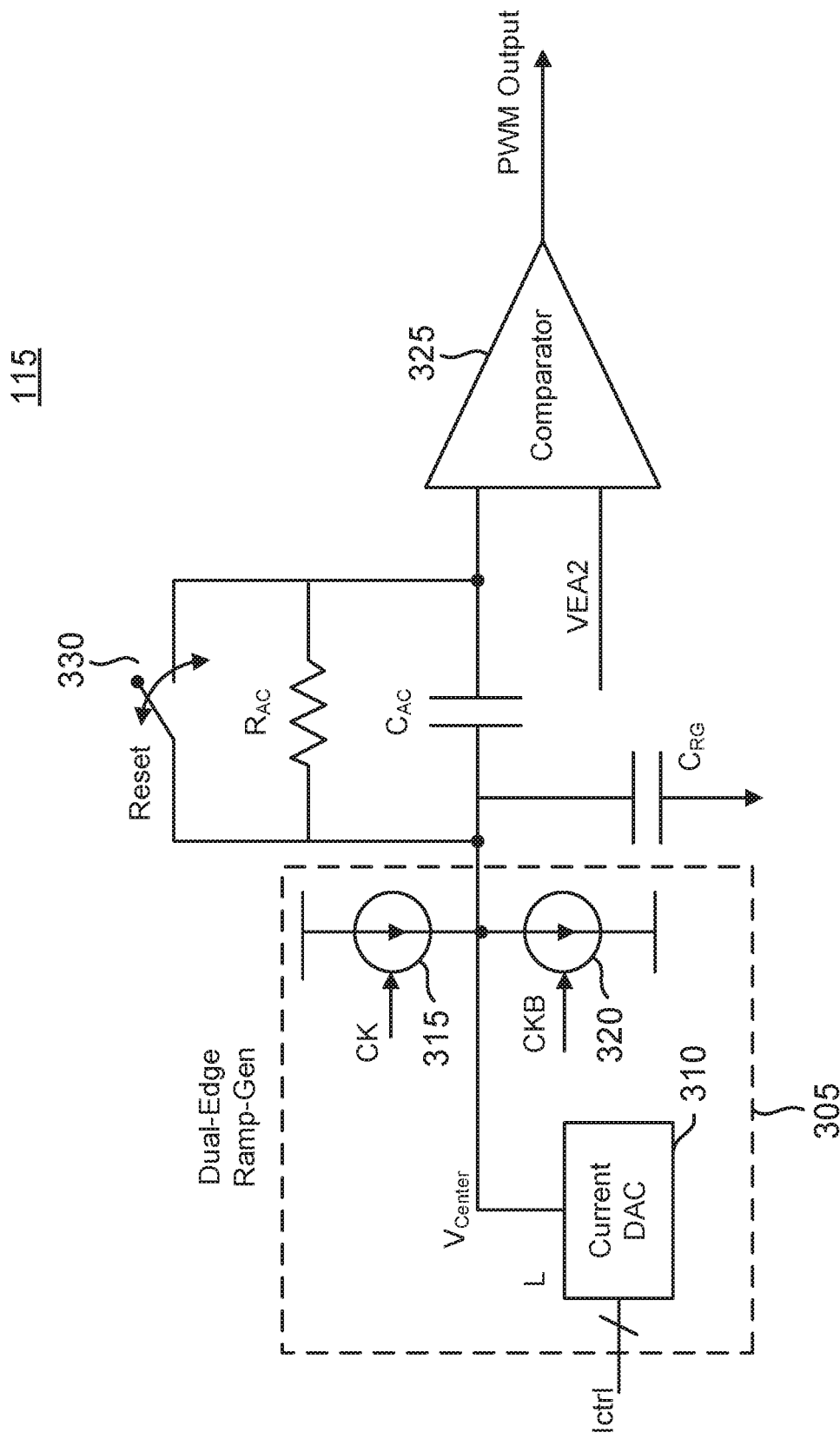
FIG. 3 is a diagram of a pulse width modulator for the second stage switching power converter of FIG. 1B in accordance with an aspect of the disclosure.

A duty cycle compensation circuit 155 responds to a slew of the total current so as to temporarily adjust the duty cycle of the active phases until the inductor currents reach their steady-state values. To adjust the duty cycle, duty cycle compensation circuit 155 controls a center voltage offset that is added to the dual-ramp signal used by each phase's dual-edge pulse width modulator (PWM) 115. An example dual-edge PWM 115 is shown in FIG. 3. Depending upon the total current slew, duty cycle compensation circuit 155 adjusts a control signal to change the common mode or center voltage ($V_{Center}$) for a dual-ramp signal from a dual-ramp generator 305. For example, duty cycle compensation circuit 155 may adjust a current control signal Ictrl received by a current digital-to-analog converter (DAC) 305. Depending upon the value of Ictrl, current DAC 305 adjusts its output current that is charging a ramp generator capacitor $C_{RG}$. To generate the dual ramp signal, a current source 315 charges capacitor $C_{RG}$ while a clock signal CK is high whereas a current sources 320 sources a current from capacitor $C_{RG}$ while a complement clock signal CKB is high. It will be appreciated that current sources 315 and 320 may instead be configured to drive their currents while their respective clock signals are low.

The charging and discharging of the capacitor $C_{RG}$ by current sources 315 and 320 produces a dual-ramp signal without any center voltage offset that is AC coupled through an AC coupling capacitor $C_{AC}$ to a comparator 325. But the dual-ramp signal has a center voltage offset applied through current DAC 310 since a resistor $R_{AC}$ couples between current sources 315 and 320 and comparator 325. When the center voltage offset has changed, a reset switch 330 may close to more rapidly change the center voltage offset of the dual-ramp signal applied to comparator 325. The output of comparator 325 goes high when the dual-ramp signal is greater than the error voltage VEA2. In alternative embodiments, the output of comparator 325 may instead go low with the dual-ramp signal is greater than the error voltage VEA2.

Figure 4:
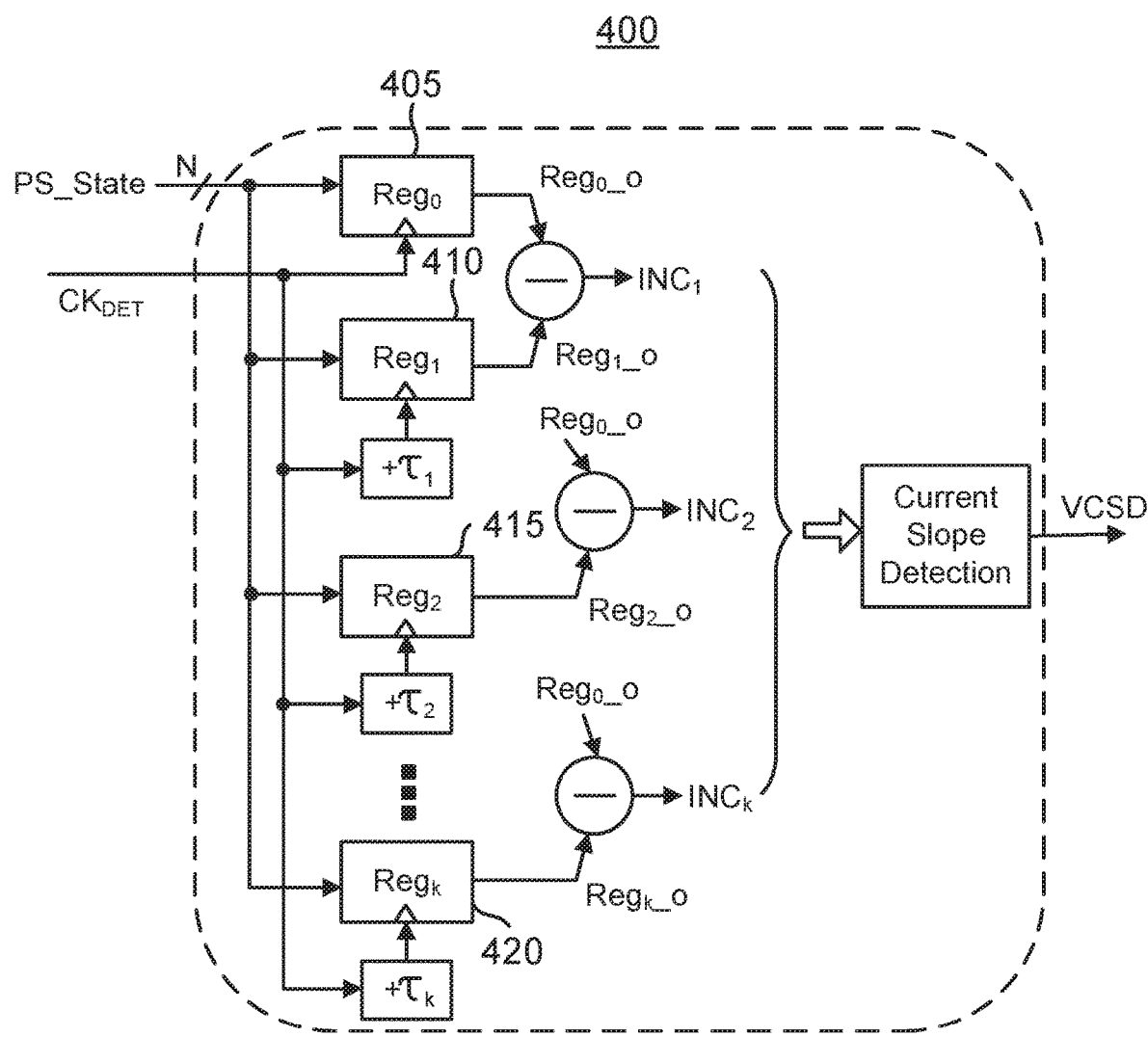
FIG. 4 illustrates a current slope detection circuit within the duty cycle compensation circuit of FIG. 1B in accordance with an aspect of the disclosure.

The amount of duty cycle (DC) offset is proportional to the amount of the center voltage offset. In some embodiments, the amount of duty cycle offset ($\Delta D$) applied to the pulse-width modulation of an active phase is a function of the load current slew. To determine the load current slew, duty cycle compensation circuit 155 may include a current slope detection circuit 400 as shown in FIG. 4 that samples the phase shedding control signal PS_State discussed earlier as a proxy for the total output current. This sampling is performed with respect to a clock signal $CK_{DET}$ that triggers an initial register 405 to sample an initial value of the shedding control signal PS_State. The clock signal is delayed by a first delay time $\tau_1$ to form a first delayed clock signal that trigger a second register 410 to sample PS_State after the delay time $\tau_1$ has elapsed. A first incremental change INC1 for the sampling of PS_State is then formed by subtracting the contents of register 405 from register 410. Additional increments are formed analogously. For example, the clock is delayed by a second delay time $\tau_2$ (e.g., $2*\tau_1$) to trigger a third register 415 to sample PS_State and so on such that the clock is delayed by a kth delay time $\tau_K$ to trigger a final register 420 to sample PS_State. The resulting increments are processed to form a voltage signal proportional to the current slope (VCSD). The signal VCSD serves as a proxy for the slew of the output current.

The theory linking the change in the output current to the change in the duty cycle for a given active phase will now be discussed. The change in the average inductor current $\Delta I$ for a buck converter's active phase during one clock period $T_{CK}$ for the PWM modulation is given by the following equation (1):

$$\Delta I = T_{CK}*D*(V\text{in}-V\text{out})/L \qquad \text{Eq. (1)}$$

where D is the duty cycle, Vin is the input voltage, and Vout is the output voltage. Equation (1) may be rewritten as shown in the following equation (2) to give the effective duty cycle D as:

$$D = \Delta I*L/(T_{CK}*V\text{in}) + (V\text{out}/V\text{in}) = \Delta D(t) + D_0 \qquad \text{Eq. (2)}$$

where $D_0$ is the steady-state duty cycle equaling (Vout/Vin) and $\Delta D$ is given by the following equation (3):

$$\Delta D = \Delta I*L/(\tau_{CK}*V\text{in}) \qquad \text{Eq. (3)}$$

Figure 5:
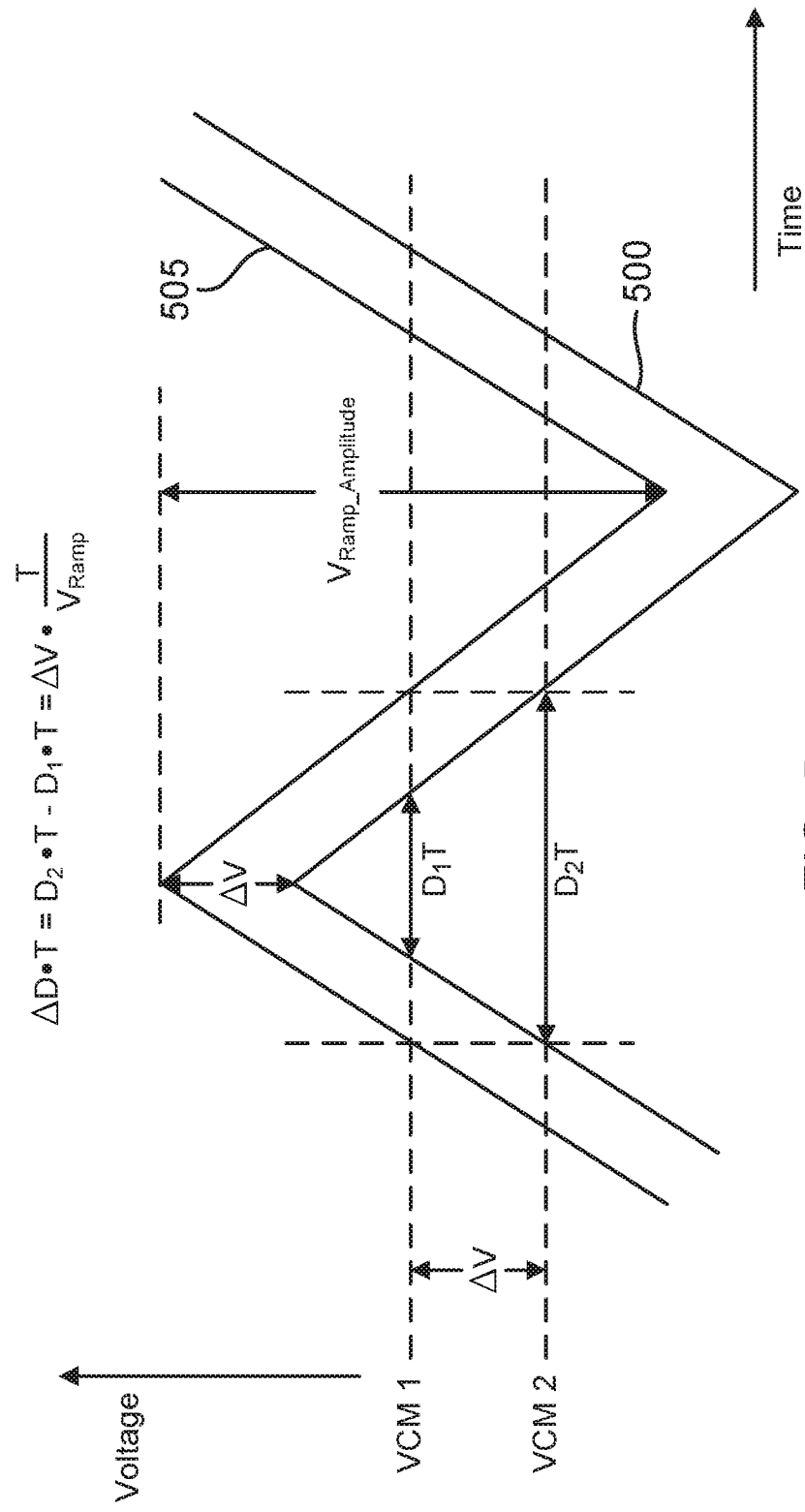
FIG. 5 is a plot of a dual ramp signal before and after a DC shift to compensate for a short-term deviation from a desired steady-state output current in accordance with an aspect of the disclosure.

The center voltage offset ($\Delta V$) applied to the dual-ramp signal will now be mapped to the duty cycle adjustment $\Delta D$. This mapping may be better appreciated with reference to the dual-ramp signals of FIG. 5. A first dual-ramp signal 505 having an amplitude $V_{Ramp}$ is DC shifted into a second dual-ramp signal 500 having the same amplitude $V_{Ramp}$. When compared to an error signal such as discussed with regard to comparator 325 of FIG. 3, first dual-ramp signal 505 produces a duty cycle D1 over a switching period T such that the high side switch (not illustrated) for the corresponding phase is switched on for a time D1*T. But the center voltage shift of $\Delta V$ applied to dual-ramp signal 500 causes it to produce a duty cycle of D2 given the same error signal comparison. It can thus be shown that $\Delta D*T$ equals $\Delta V*(T/V_{Ramp})$. This equality combined with equation (3) leads to the following equation (4)

$$\Delta D = \Delta I*L(\tau_{CK}*V\text{in}) = \Delta V/V_{Ramp} \qquad \text{Eq. (4)}$$

By adjusting the center voltage offset $\Delta V$, duty cycle compensation circuit 155 may thus compensate for the load current change because the changes in average inductor current are proportional to the duty cycle offset.

Figure 6A:
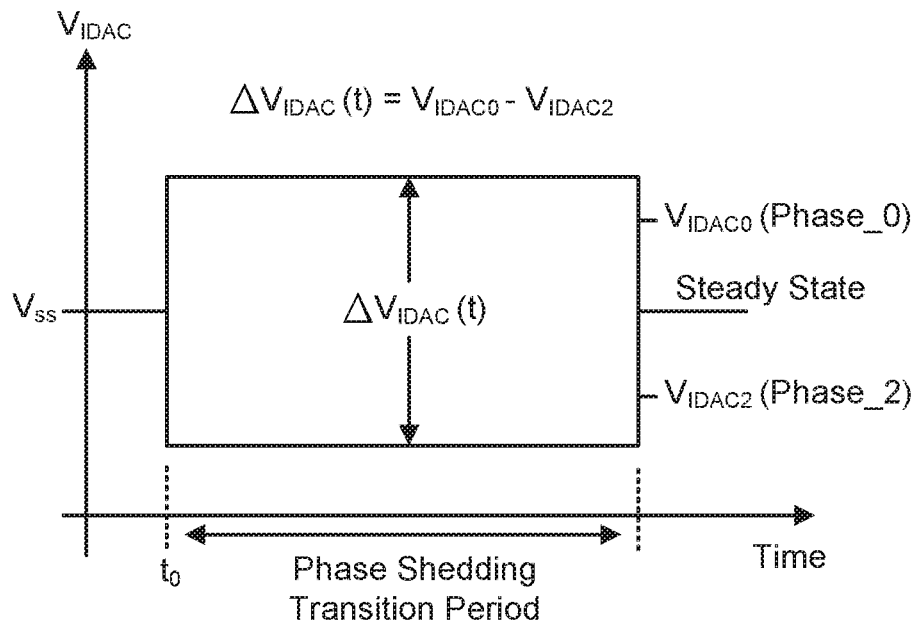
FIG. 6A is a plot of the DC offset for a pre-existing phase and a newly-activated phase during the transition period from operation with just the pre-existing phase to operation with both the pre-existing phase and the newly-activated phase in response to a relatively moderate output current change in accordance with an aspect of the disclosure.

As discussed previously, the phase shedding control is also responsive to the load current change. For example, consider the case in which a phase (or phases) are activated in response to a relatively small or medium-sized increment in the total load current. The current through the existing phases will drop to a new steady-state value since the total output current is now shared across more phases. The current in the newly-activated phases must increase to the steady-state value. The total current change as mapped to the duty-cycle changes may thus be applied in complementary or opposing fashions so that the currents in the pre-existing phases may more quickly drop to their new steady-state values and so that the currents in the newly-activated phases may more quickly increase to their steady-state values. For example, if the total current change is less than a first threshold value, the duty-cycle changes (and thus the DC offsets) may be made complementary between the phases that were already active (the pre-existing phases) and those being newly activated. An example of complementary DC offsets is shown in FIG. 6A. As known in the buck converter arts, the steady state duty cycle ($D_0$ of equation (2) above) is given by the ratio of the Vout/Vin if the switch losses and other secondary factors are ignored. The steady state duty cycle $D_0$ for a pre-existing phase will thus remain the same after additional phases are activated. This steady-state duty cycle D0 corresponds to a center voltage offset of zero volts (Vss) since there are no output current changes during steady state operation. In FIG. 6A, a single phase (Phase_0) is active prior to a current load step ΔI at a time t0, whereupon a second phase (Phase_2) is activated. The current load step ΔI maps to a total center voltage offset of ΔV that is split so that the dual-ramp signal for Phase_0 has a center voltage offset of +ΔV/2 whereas Phase_2 has a center voltage offset of −ΔV/2. These center voltage offsets are applied over a phase shedding transition period. For example, duty cycle compensation circuit 155 may monitor the individual inductor currents and thus monitor whether an inductor current has reached its steady-state value, whereupon the phase shedding transition period is terminated such that the duty cycle offsets are cancelled. Since the duty cycle offsets are opposing, the total output current is maintained constant during the phase shedding transition period and after its termination. Note that by increasing the total duty cycle offset, the transient period may be shortened.

The polarity of the center voltage offset for a phase depends upon the type of high-side switch transistor (NMOS or PMOS) in the phase and also the polarity (plus or minus) for the comparison by comparator 325 (FIG. 3). For example, comparator 325 may be configured to assert its output signal when the error signal is greater than the shifted dual-ramp signal. Conversely, comparator 325 may be configured to assert its output signal when the shifted dual-ramp signal is greater than the error signal. In general, the center voltage offset for the pre-existing phase 0 is shifted so that the current in phase 0 is reduced in response to output current changes below a threshold value (relatively moderate output current changes). Referring again to FIG. 6A, it may be that such a reduction in phase 0 current requires an increase in the center voltage offset for the shifted dual-ramp signal. But in alternative embodiments, such a reduction in phase 0 current would be in response to a decrease in the center voltage offset. Regardless of the polarity of the center voltage offset (and thus the polarity of the duty cycle offset), the center voltage offset is applied in opposing fashions for the pre-existing and newly-added phases for relatively modest changes in the output current. Once the inductor currents in the duty-cycle-offset phases have reached their steady state values such as sensed by current sensors 140 (FIG. 1B), the DC offsets are cancelled to end the transition period.

Figure 6B:
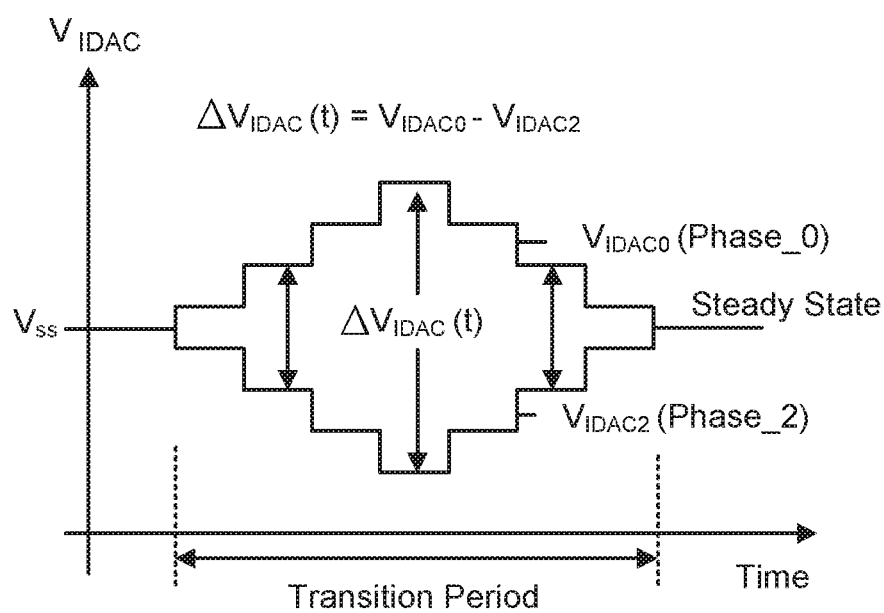
FIG. 6B is a plot of a DC offset for the pre-existing phase and the newly-activated phase of FIG. 6A in which the DC offset it gradually changed in increments over the transition period.

In addition, the changes in the center voltage offset for each phase may be gradually applied and then removed in increments as shown in FIG. 6B. The center voltage offset for phase 0 (the pre-existing phase) is thus gradually increased to a maximum value at the midpoint of the transition period and then gradually reduced until it reaches its steady-state value at the end of the transition period. The changes in the center voltage offset for phase 2 (the newly-activated phase) are incremented in an opposing fashion.

It is commonplace for a buck converter load current to suddenly increase in a substantial fashion (greater than the threshold value that governs the complementary DC offsets applied as discussed with regard to FIGS. 6A and 6B). Such an increase is thus greater than the threshold value that determined the slow to medium load current steps in which the duty cycle adjustments are applied in opposing fashions depending upon whether a phase was pre-existing or being newly activated. Should the load current change be greater than that threshold, the active phases may all be shifted by a duty cycle (DC) offset in the same direction (same polarity) to boost the inductor current in each active phase over the transition period. Duty cycle compensation circuit 150 would again monitor the inductor currents in the active phases to determine whether they have reached their steady-state values, whereupon the same-polarity DC offset for the dual-ramp signals would be cancelled.

Referring again to FIGS. 1A and 1B, the phase-shedding control implemented by phase shedding control logic circuit 150 in second stage 110 may control the phase shedding in first stage 105 in a cross-domain phase shedding control embodiment. Alternatively, first stage 105 may control its own phase shedding independently of second stage 110. Since the output power for both stages is approximately equal, the current ratio between the two stages is constant and is proportional to the voltage ratio and the second stage efficiency. Thus, the activation of a given number of phases by phase shedding control logic circuit 150 may be mapped into a corresponding number of phases for activation in first stage 105. It may be shown that the number of active phases ($PH_{1\_Active}$) in first stage 105 based upon the number of active phases ($PH_{2\_Active}$) is given by the following equation (5):

$$PH_{1\_Active} = (Vout2/\eta_2 * Vout1) * (N/M) * PH_{2\_Active} \qquad \text{Eq. (5)}$$

where Vout2 is the output voltage from second stage 110, Vout1 is the output voltage from first stage 105, $\eta_2$ is the second stage efficiency, N is the total number of phases in second stage 110, and M is the total number of phases in first stage 105. The phase shedding in second stage 110 would thus be mapped to a corresponding number of activated phases in first stage 105. Note that first stage 105 may also practice the duty cycle offset discussed above with regard to second stage 110.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:

1. A multi-phase switching power converter, comprising:
   a plurality of phases, wherein each phase includes: a pulse width modulator having a dual-ramp signal generator for generating a dual-ramp signal; a comparator for comparing the dual-ramp signal to an error signal to generate a pulse-width-modulated signal; and a current sensor for sensing an inductor current for the phase to provide a sensed inductor current, wherein each phase is either an active phase or an inactive phase responsive to an enabling signal;
   a summing circuit for summing each sensed inductor current to provide a sensed total output current;
   a phase shedding control circuit configured to control the enabling signal responsive to a change in the sensed total output current to change a total for the active phases; and
   a duty cycle adjustment circuit configured to adjust a DC offset for the dual-ramp signal in the active phases during a temporary transition period following the change in the total for the active phases.

2. The multi-phase switching power converter of claim 1, wherein prior to the temporary transition period the total for the active phases equaled a first number of phases; and wherein the duty cycle adjustment circuit is configured to adjust the DC offset for each phase in the first number of phases such that the inductor current in each phase in the first number of phases is reduced from a steady-state value during the temporary transition period responsive to the sensed total output current being less than a threshold value.

3. The multi-phase switching power converter of claim 2, wherein the total for the active phases equals the first number of phases plus a second number of phases, and wherein the duty cycle adjustment circuit is configured to adjust the DC offset for each phase in the second number of phases such that the inductor current in each phase in the second number of phases is increased from the steady-state value during the temporary transition period responsive to the sensed total output current being less than the threshold value.

4. The multi-phase switching power converter of claim 1, wherein the duty cycle adjustment circuit is configured to adjust the DC offset for the dual-ramp signal in each active phase so as to increase the inductor current for each active phase from a steady-state value during the temporary transition period responsive to the sensed output current being greater than a threshold value.

5. The multi-phase switching power converter of claim 1, wherein the multi-phase switching power converter is a multi-phase buck converter.

6. The multi-phase switching power converter of claim 5, wherein the multi-phase buck converter comprises a second stage in a two-stage multi-phase buck converter.

7. The multi-phase switching power converter of claim 6, wherein the phase shedding control circuit is further configured control a phase shedding transition in a first stage of the two-stage multi-phase buck converter.

8. The multi-phase switching power converter of claim 2, wherein the duty cycle adjustment circuit is further configured to adjust the DC offset for the dual-ramp signal in the active phases during the temporary transition period to equal a constant DC offset over the temporary transition period.

9. The multi-phase switching power converter of claim 2, wherein the duty cycle adjustment circuit is further configured to adjust the DC offset for the dual-ramp signal in the active phases during the temporary transition period to equal a changing DC offset over the temporary transition period.

10. The multi-phase switching power converter of claim 9, wherein the duty cycle adjustment circuit is further configured to first increase and then decrease the changing DC offset over the temporary transition period.

11. The multi-phase switching power converter of claim 1, wherein the duty cycle adjustment circuit is further configured to cancel the DC offset for the active phases to terminate the temporary transition period responsive to the inductor currents in the active phases equaling a steady-state value.

12. The multi-phase switching power converter of claim 2, wherein each dual-ramp signal generator includes a current digital-to-analog converter for adjusting the DC offset of the dual-ramp signal generator's dual-ramp signal.

13. The multi-phase switching power converter of claim 12, wherein each dual-ramp signal generator includes a first current source for charging a dual-ramp capacitor responsive to a first clock signal to increase the dual-ramp signal generator's dual-ramp signal and includes a second current source for discharging the dual-ramp capacitor responsive to a second clock signal to decrease the dual-ramp signal generator's dual-ramp signal.

14. The multi-phase switching power converter of claim 13, wherein each dual-ramp signal generator further includes an AC coupling capacitor coupled between an output node for the dual-ramp signal generator and the dual-ramp signal generator's dual-ramp capacitor and further includes a resistor coupled between the output node for the dual-ramp signal generator and the dual-ramp signal generator's dual-ramp capacitor.

* * * * *